Oct. 26, 1926.
G. H. JAQUES
1,604,581
CASING HEAD
Filed Sept. 25, 1925
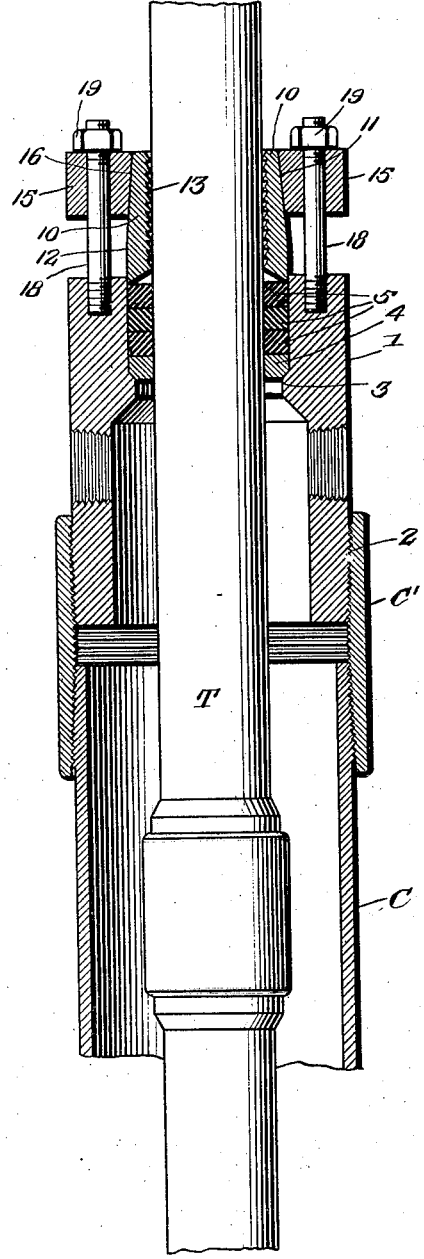
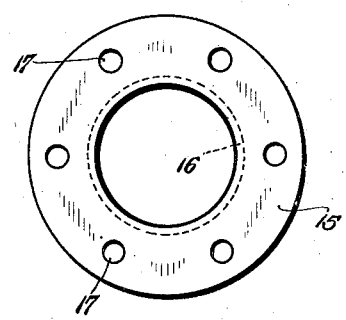
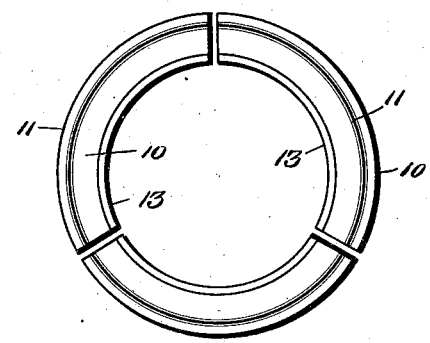
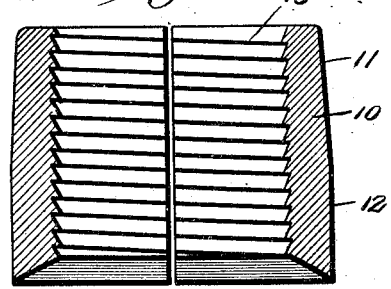
Inventor
G. H. Jaques,
By O'Neill & Bunn
Attorney Patented Oct. 26, 1926.

1,604,581

UNITED STATES PATENT OFFICE.

GEORGE H. JAQUES, OF CASPER, WYOMING.

CASING HEAD.

Application filed September 25, 1925. Serial No. 58,625.

The invention relates to certain improvements in casing heads for oil wells and the like and has for its object to provide a simple and efficient type of head including the tubular member or main body portion thereof having an internal shoulder to support the packing, arcuate slips having inner serrated surfaces and outer tapered surfaces, the former serving to grip and anchor the well tubing within the casing head, said slips being adapted to enter the bore of the head and compress the packing, a ring having a tapered opening cooperating with the tapered outer surfaces of the slips, and means for adjustably securing the ring to the upper end of the casing head, whereby the downward movement of the ring will move the slips inwardly in gripping engagement with the well tubing and downwardly to compress the packing.

The invention is illustrated in the accompanying drawings, in which:—

Fig. 1 is a sectional elevation of the head as applied to the casing and tubing.

Fig. 2 is a plan view of the anchor ring.

Fig. 3 is a plan view of the slips.

Fig. 4 is a vertical sectional elevation of the slips.

Referring to the drawings, 1 indicates the main or body portion of the tubular head, which is externally screw threaded at its lower end to engage a coupling C' on the upper end of the well casing C. The interior of the tubular body 1 is provided with an annular shoulder 3 forming a seat for a split packing supporting ring 4, upon which the packing rings 5 of rubber, or other suitable material, are superposed and held within the reduced upper bore of the head to effect a fluid tight joint between the head and the well tubing T, as will be understood.

Surrounding the tubing T and engaging the bore of the head above the packing are slips 10 which are arcuate in cross section and have their inner faces provided with downwardly inclined teeth or serrations 13 and the upper portions of their outer faces, above the cylindrical portion 12, beveled as at 11. These slips are fashioned so as to fit within the bore of the head and closely embrace the tubing and, to this end, the slips are preferably formed originally as a tubular sleeve having the upper portion of its exterior turned to produce the taper 11, its interior bored to fit the exterior of the tubing and having the downwardly inclined threads 13 turned in its interior, said tubular member then being split longitudinally in three equal parts by means of a thin parting tool, as indicated in Figures 3 and 4.

Tapped into the upper end of the tubular member 1 is a series of bolts 18, the outer ends of which are screw threaded to receive adjusting nuts 19.

An anchor ring 15 has a tapered central opening 16, the taper of which is complementary to the tapered outer surfaces of the slips, said ring also having a series of bolt receiving holes 17 through which the bolts 18 pass, the nuts 19 serving to force the ring 15 toward the body of the head 1, whereby the tapered inner wall 16 of the ring 15 forces the slips downwardly to compress the packing 5 to effect a fluid tight joint between the tubing T and the head 1 and simultaneously to force the slips inwardly into gripping and anchoring engagement with the outer surface of the tubing T, thereby securely anchoring the tubing within the head and completely obviating any danger of leakage or blow outs.

While the invention has been illustrated and described with reference to the well tubing T, it will be understood that it is not restricted to use with such tubing, but is equally applicable to smaller size casing, when the latter is employed in connection with the outer casing.

What I claim is:

1. The combination of a well casing and a string of tubing therein, of a casing head comprising a tubular member adapted to be secured to the well casing and provided with an internal shoulder, packing supported on said shoulder, arcuate slips having serrated inner faces and tapered outer faces, the inner faces adapted to engage the well tubing and the lower ends of the slips engaging the packing, a ring having a tapered opening cooperating with the tapered outer surfaces of the slips, and means for adjustably securing said ring to the upper end of the tubular member; whereby movement of the ring toward said member will move the slips downwardly to compress the packing and inwardly to grip and anchor the tubing.

2. The combination of a well casing and a string of tubing therein, of a casing head comprising a tubular member adapted to be secured to the well casing and provided with an internal shoulder, packing supported on said shoulder, arcuate slips having serrated inner faces and tapered outer faces, the inner faces adapted to engage the well tubing and the lower ends of the slips engaging the packing, a ring having a tapered opening cooperating with the tapered outer surfaces of the slips and bolts mounted in the upper end of the tubular member and engaging said ring to adjust the latter toward and from the tubular member, whereby the slips are moved downwardly to compress the packing and inwardly to grip and anchor the tubing.

3. The combination of a well casing and a string of tubing therein, of a casing head comprising a tubular member adapted to be secured to the well casing and provided with an internal shoulder, packing supported on said shoulder, arcuate slips having serrated inner faces and tapered outer faces, the inner faces adapted to engage the well tubing and the lower ends of the slips engaging the packing, a ring having a tapered opening cooperating with the tapered outer surfaces of the slips and a series of bolt holes, bolts mounted in the upper end of said tubular member and passing through the holes in said ring, and nuts on the bolts serving to force the ring downwardly, thereby moving the slips downwardly to compress the packing and inwardly to grip and anchor the tubing.

In testimony whereof I affix my signature.

GEORGE H. JAQUES.